United States Patent

[11] 3,547,069

| [72] | Inventor | Ting Chang Tao<br>Pawtucket, R.I. |
|---|---|---|
| [21] | Appl. No. | 578,175 |
| [22] | Filed | Sept. 9, 1966 |
| [45] | Patented | Dec. 15, 1970 |
| [73] | Assignee | Fram Corporation<br>East Providence, R.I.<br>a corporation of Delaware. by mesne assignments |

[54] DIFFERENTIAL PRESSURE INDICATOR
3 Claims, 5 Drawing Figs.

[52] U.S. Cl. .................................................. 116/70,
210/90
[51] Int. Cl. .................................................. G01l 19/12
[50] Field of Search ............................................. 116/70,
117; 210/85, 90; 73/406, 420, 392; 137/517;
200/82, 83

[56] References Cited
UNITED STATES PATENTS

| 337,236 | 3/1886 | Briscoe | 137/517 |
|---|---|---|---|
| 2,041,198 | 5/1936 | McLean | 137/517 |
| 2,935,040 | 5/1960 | Steensen | 116/117 |
| 3,028,009 | 4/1962 | Scavuzzo et al. | 210/90 |
| 3,091,213 | 5/1963 | Maskell et al. | 116/70 |
| 3,146,757 | 9/1964 | Heymann et al. | 116/70 |
| 3,212,471 | 10/1965 | Willis | 116/70 |
| 3,237,454 | 3/1966 | Gray, Jr. | 73/419 |
| 3,283,902 | 11/1966 | Farris et al. | 210/90 |
| 3,335,863 | 8/1967 | Silverwater | 210/90 |

*Primary Examiner*—Louis J. Capozi
*Attorney*—W. R. Hulbert

ABSTRACT: In a differential pressure sensing and indicating device for sensing differential pressure between two sources and moving an indicator in response to a sensed pressure differential, apparatus for preventing movement of the indicator unless the sensed pressure differential continues for more than a predetermined period of time.

PATENTED DEC 15 1970
3,547,069
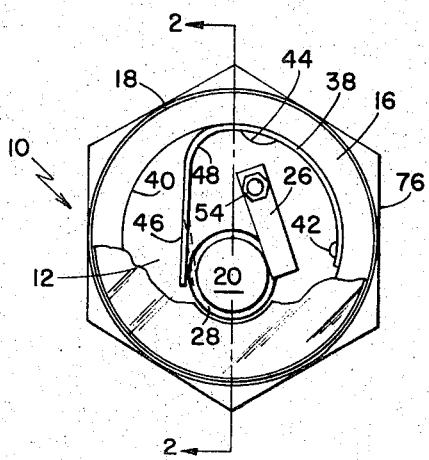
FIG 1
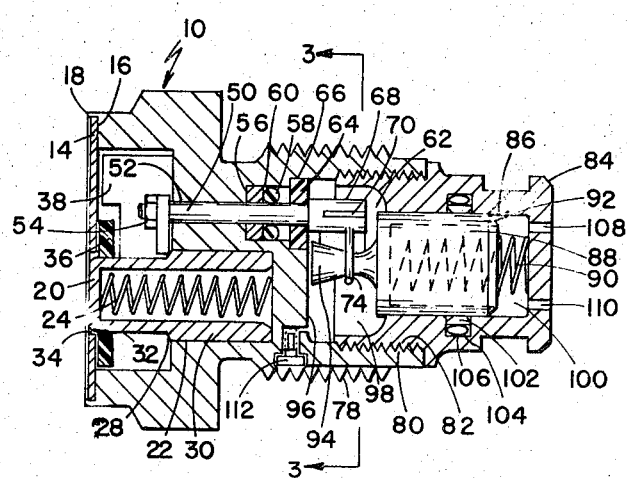
FIG 2
FIG 3
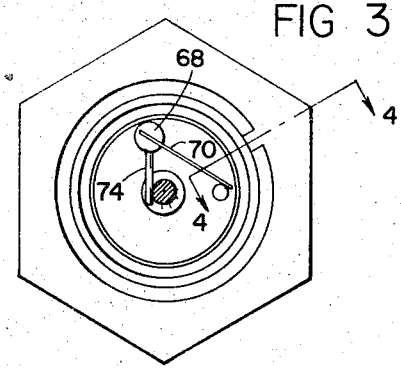
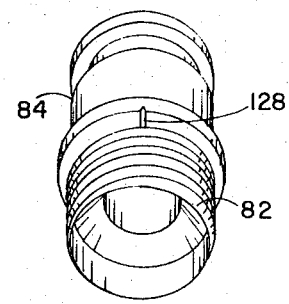
FIG 5
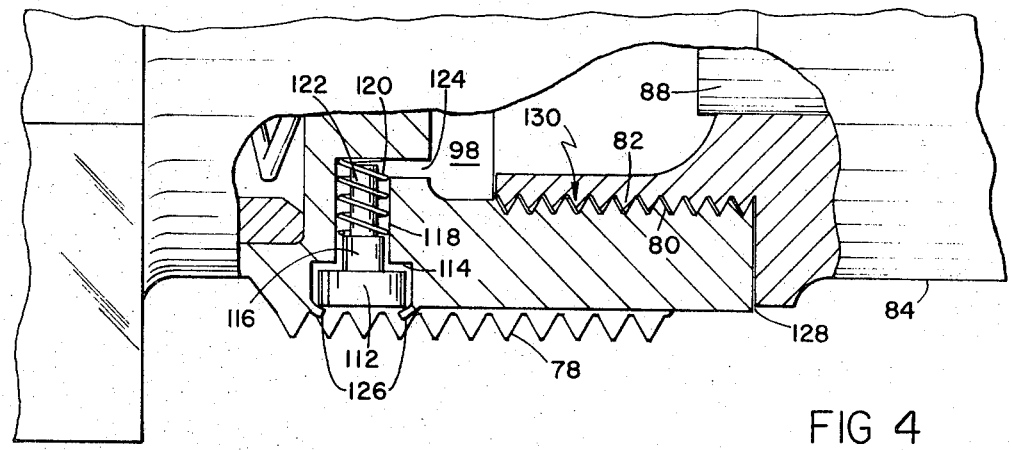
FIG 4

DIFFERENTIAL PRESSURE INDICATOR

This invention relates to differential pressure indicators. It is a primary object of this invention to provide a differential pressure indicator which is not responsive when the pressure change is a merely temporary surge rather than longer enduring, and which is simple, rugged and inexpensive.

The invention is particularly applicable to differential pressure sensing and indicating devices of the type having a housing, a pressure responsive member movably mounted in a chamber in the housing and which divides the latter into two compartments, passages providing communication between one of the compartments and a first pressure source and the other compartment and a second pressure source, and a visual indicator released by movement of the member responsive to differential of pressure between the sources. The improvement of the invention constitutes mechanism for preventing release of the indicator unless the pressure differential continues for more than a predetermined period of time. According to the invention, there is provided a normally open valve in the passage to one of the compartments, the valve being arranged to be closed by change in the pressure of the source to which it is exposed as compared with the pressure on the other side of the valve. Mechanism is provided for biasing the valve toward its open position but this mechanism is adapted to be overcome by the pressure change which closes the valve. A restrictive duct communicates between the last named source and the compartment closed by the valve, allowing gradual pressure equalization therebetween when the valve is in its closed position, permitting the biasing mechanism to reopen the valve when such equalization occurs. The restrictive duct is preferably formed at least in part by the interstices between mating threads of two portions of the housing and preferably the valve is provided with a valve stem, the biassing mechanism comprising a spring engaging such stem and working against a portion of the housing to urge the valve open.

Other objects, features, and advantages will appear from the following description of a preferred embodiment of the invention, taken with the accompanying drawings, in which:

FIG. 1 is a top plan view of a differential pressure indicator in accordance with this invention with the cover partially broken away.

FIG. 2 is a sectional view along line 2–2 of FIG. 1.

FIG. 3 is a sectional view along line 3–3 of FIG. 2.

FIG. 4 is a sectional view on an enlarged scale of a portion of the device along line 4–4 of FIG. 3.

FIG. 5 is a perspective view of the piston housing removed from the main housing.

Referring to FIGS. 1 and 2 a housing 10 is provided with a recess 12 at one end sealed by cover 14 resting on ledge 16 and contained within annular rim 18. Indicator 20 mounted in cylinder 22 is urged outwardly by spring 24 and is retained against the spring force by movable stop 26 in engagement with shoulder 28, see FIG. 1. Shoulder 28 distinguishes base 30 of indicator 20 from narrower head 32 and serves to limit the movement of head 32 through aperture 34 in cover 14 by abutting a rubber collar 36.

Thermal coil 38 is fastened at one end to inner wall 40 of recess 12 by pin 42 and is fastened where it leaves wall 40 by a strong adhesive 44. Free end 46 thereof begins in a curve 48 extending away from wall 40 and towards the center of recess 12 tangentially of indicator 20. At temperatures of 35°F. ± 15° F. or less the radius of curve 48 is sufficiently shortened to cause end 46 to engage shoulder 28 and lock indicator 20 against movement.

Stop 26 is mounted on shaft 50 by means of a nut 54 and is rotatable in bore 52. A backup ring 56 and an O-ring 58 in bore 60 surround shaft 50 and seal recess 12 from the enclosure or chamber 62 in the lower portion of housing 10. Beyond bore 60 shaft 50 is supported by bearing 64 fitted in recess 66, and is of an enlarged diameter forming bushing 68. Bushing 68 supports cam follower pin 74, includes a slot 72 in which spring 70 is mounted, and in conjunction with an end face of bearing 64, limits axial movement of shaft 50.

The upper portion of housing 10 contains a hexagonal perimeter 76 adapted to receive a wrench, and the lower portion contains external threads 78 for engagement with compatible threads in an opening in the system to be monitored. Internal threads 80 mate with external threads 82 on piston housing 84 to complete chamber 62. Cylindrical bore 86 in housing 84 forms the part of chamber 62 in which piston 88 is movable. Spring 90 recessed in bore 92 of piston 88 urges piston 88 to the left as seen in FIG. 2 to the limit permitted by movable cam stop 94 as it contacts end wall 96 of the closure.

The chamber 62 is separated into a first compartment 98 and a second compartment 100 by a piston 88. A plastic ring 102 and an O-ring 106 are mounted in channel 104 with ring 102 within ring 106 and engaging the periphery of piston 88. Low pressure is introduced to compartment 100 via apertures 108 and 110, high pressure is introduced to compartment 98 via valve 112. The existence of a pressure differential between the two sources will be indicated by indicator 20, as hereinafter described.

Valve 112 seats in valve seat 114 with valve stem 116 received in bore 118, FIG. 4. Spring 120, surrounding the reduced portion 122 of stem 116, biases valve 112 open. Fluid access to compartment 98 is via bore 118 and passage 124 when valve 112 is open. Detents 126 retain valve 112 against the displacing force of the spring 120. A second but very confined passage to compartment 98 is through restrictive duct 128, 130 the latter comprising the interstices between threads 80 and 82 (FIGS. 4 and 5); threads 80 and 82 are designed with sufficient tolerance to provide a restrictive passage to compartment 98. Channel 128 leading to passage 130 is "V" shaped, and is preferably 0.0015 inch wide by 0.002 inch deep. At differential pressures of approximately 70 pounds per square inch these dimensions impose a 3—5 second delay in pressure equalization of compartment 98 when the valve 112 is closed. It should be appreciated that the delay can be changed to suit conditions by varying the dimensions of said channel or providing additional channels. Also, a limited adjustment in the delay can be made by changing the tightness of the threaded connection between the parts.

In operation, if a relatively low pressure exists at apertures 108, 110, and high pressure at valve 112, piston 88 is driven to the right as seen in FIG. 2 against the force of spring 90. This causes cam surface 94 to move pin 74 and rotate shaft 50, and thereby rotating stop 26 counterclockwise as shown in FIG. 1. A sufficient differential in pressure, approximately 70 pounds per square inch in one example, causes stop 26 to clear shoulder 28 and release indicator 20 which is pushed to the left, as seen in FIG. 2, out of the housing where it remains protruding until manually reset.

Brief high pressure surges, which could otherwise trip the mechanism and release indicator 20, are isolated from compartment 98 by the action of valve 112. A high pressure surge overcomes spring 120 and shuts valve 112, preventing increase of pressure in compartment 98. Restrictive duct 128, 130 now provides the only communication between the high pressure and compartment 98. If the surge lasts longer than the delay provided by the restrictive channel, 3—5 seconds in this embodiment, the increased pressure will reach compartment 98 equalizing the pressures on valve 112, so that spring 120 will again hold valve 112 open for normal operation. If the surge is of short duration, disappears before it has reached compartment 98, it passes without affecting indicator operation. In any case when the pressure in compartment 98 plus the force of spring 120 equals the external pressure, the valve 112 will be opened by the spring 120 and the indicator will be again ready for normal operation.

It should be appreciated that the restrictive duct and spring-biased valve may be incorporated as well in the second compartment of this embodiment, which communicates with a source of low pressure. A sudden decrease in pressure would then cause the valve to shut and would isolate that compartment from the sudden drop in pressure. If the decrease in pressure continues long enough for it to reach that compartment through the restrictive duct, the pressure on either side of the valve will be equalized and the valve will once again open under the force of the spring.

Other embodiments will occur to those skilled in the art and are within the following claims:

I claim:

1. In a differential pressure sensing and indicating device having a housing defining an interior chamber, a pressure responsive member mounted for movement within said chamber and dividing said chamber into two compartments, a first duct extending from one of said compartment through said housing for providing communication between said one compartment and a first pressure source, a second duct extending from the other of said compartments through said housing for providing communication between said other compartment and a second pressure source, and indicating means including an indicator actuated by movement of said member in response to a differential of pressure between said sources, the improvement which comprises apparatus for preventing actuation of said indicator unless said pressure differential continues for more than a predetermined period of time, said apparatus comprising:

normally open valving in said first duct, said valving including a valve mounted for movement between a first position in which said first duct is open and a second position in which said valve closes said first duct, and mechanism biasing said valve towards said first position and permitting movement of said valve from said first position to said second position when the differential of pressure between said one compartment and said first pressure source is greater than a predetermined level; and, a third duct extending from said one compartment through said housing for providing communication between said one compartment and said first pressure source, said third duct including therein flow restriction means for allowing gradual pressure equalization between said one compartment and said first pressure source when said valve is in said second position.

2. The improvement as claimed in claim 1 wherein said restrictive duct is formed at least in part by the interstices between mating threads of two portions of said housing and said flow restriction means includes said threads.

3. The improvement as claimed in claim 1 wherein said valve is provided with a valve stem and said mechanism biasing said valve comprises a spring engaging said stem and working against a portion of said housing.